(12) United States Patent
Rahn et al.

(10) Patent No.: US 11,438,162 B2
(45) Date of Patent: Sep. 6, 2022

(54) NETWORK DEVICE AUTHENTICATION (71) Applicant: Arista Networks, Inc., Santa Clara, CA (US)

(72) Inventors: Ethan Rahn, Agoura Hills, CA (US); Baptiste Covolato, Vancouver (CA); Roy Wen, Vancouver (CA); Julien Gomes, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 58 days.

(21) Appl. No.: 16/824,382

(22) Filed: Mar. 19, 2020

(65) Prior Publication Data
US 2021/0297259 A1 Sep. 23, 2021

(51) Int. Cl.
*H04L 9/08* (2006.01)
*H04L 9/32* (2006.01)

(52) U.S. Cl.
CPC .......... *H04L 9/3234* (2013.01); *H04L 9/0897* (2013.01); *H04L 9/3213* (2013.01); *H04L 9/3268* (2013.01); *H04L 2209/127* (2013.01)

(58) Field of Classification Search
CPC ... H04L 9/3247; H04L 9/0897; H04L 9/3263; H04L 63/00; H04L 9/3213; H04L 9/3234; H04L 9/3268; H04L 2209/127
See application file for complete search history.

(56) References Cited

U.S. PATENT DOCUMENTS

| | | | |
|---|---|---|---|
| 9,230,109 B2 * | 1/2016 | Wooten | H04L 9/0897 |
| 9,501,801 B2 | 11/2016 | Wong et al. | |
| 9,953,143 B2 | 4/2018 | Tee et al. | |
| 10,735,190 B1 * | 8/2020 | Khare | H04L 9/0897 |
| 2003/0037244 A1 * | 2/2003 | Goodman | G06F 21/572 |
| | | | 713/189 |
| 2004/0019564 A1 | 1/2004 | Goldthwaite et al. | |
| 2013/0211874 A1 | 8/2013 | Wu et al. | |
| 2016/0241701 A1 | 8/2016 | Gray et al. | |
| 2017/0039352 A1 * | 2/2017 | Volkening | H04L 63/0281 |
| 2017/0075699 A1 * | 3/2017 | Narayanan | G06F 21/575 |
| 2017/0155513 A1 * | 6/2017 | Acar | G06Q 20/40145 |
| 2017/0302459 A1 * | 10/2017 | Fenner | H04L 9/3213 |
| 2019/0163597 A1 | 5/2019 | Shibamura | |
| 2019/0182044 A1 * | 6/2019 | Mullen | G06Q 20/3829 |
| 2020/0162318 A1 | 5/2020 | Patil et al. | |
| 2020/0186365 A1 | 6/2020 | Kumar et al. | |
| 2021/0120412 A1 | 4/2021 | Bruner et al. | |
| 2021/0152353 A1 * | 5/2021 | Canillas | H04L 9/3263 |
| 2021/0297409 A1 | 9/2021 | Rahn et al. | |

* cited by examiner

*Primary Examiner* — Mohammad A Siddiqi
(74) *Attorney, Agent, or Firm* — Chamberlain, Hrdlicka, White, Williams & Aughtry (57) ABSTRACT A method for authenticating an origin of a network device. The method includes reading one or more encrypted parameters from a memory of the network device, decoding the one or more encrypted parameters, and determining whether one or more of the decoded parameters match parameters obtained from a trusted platform module (TPM) installed in the network device and/or a read only memory (ROM) of the network device. In response to a mismatch between the decoded parameters and the parameters obtained from the TPM or the ROM, at least one of suspending operation of the device or transmitting a report of an authentication failure across a network on which the device is operating.

15 Claims, 7 Drawing Sheets

NETWORK DEVICE AUTHENTICATION

BACKGROUND

The present disclosure relates to network device attestation and verification. Many counterfeit network devices (e.g., switches, routers, etc.) have been distributed and represented as originating from a particular manufacturer. In some cases, such devices may be configured in a manner that directly compromises the security of a network with embedded code or configurations that permit unauthorized access to network traffic processed by the device. As a result, a remote server communicating with such a device may require that the device "remotely attest" to the authenticity of the hardware and software operating on the device before relying on the device to receive or communicate sensitive network data.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

In order to present reliable evidence to a remote server requesting attestation, a device may contain a Trusted Platform Module (TPM). A TPM includes a security co-processor embedded in the device and is designed to be tamper-resistant with cryptographic hardware. The TPM may include a secure private/public key pair ("endorsement key" (EK)) unique to the TPM.

In some circumstances, an administrator of a local network may want to first verify the authenticity of the device's origin (e.g., manufacturer) even before integrating the device into the local network. In some embodiments, a TPM is integrated into the device at the time of manufacture and configured/programmed by the manufacturer with an EK. Information identifying the device (e.g., a serial number), the public key of a public/private encryption key pair, and the EK are signed by a device certification authority ("CA") certificate (derived from a root CA certificate), maintained securely by a trusted source (e.g., a device manufacturer, and is used by the trusted source to generate a signed package that may be programmed into the non-volatile memory of the device (e.g., flash memory or ROM). When a device is being installed into a network and is first booted and/or has been updated with new software (e.g., an extensible operating system (EOS)), the software installed on the device uses the device CA to verify the signed package (including its signature and parameters identifying the device) and the TPM to confirm that the device originated from the expected manufacturer.

In some embodiments, the software (e.g. EOS) first determines whether the device supports a particular authentication procedure such as described. The software may first verify that the device has a TPM chip. This may be done by obtaining the model number from the device (e.g., from ROM installed on the device) and comparing the model number to a "whitelist" of models that are embedded with the software. The "whitelist" may be maintained at a server hosted by the manufacturer, for example, and/or incorporated with the software package operating on the device. If the software cannot verify that the device has a TPM chip or the TPM chip cannot be communicated with, the software may discontinue the verification/authentication process. Different techniques may be utilized to further authenticate the device utilizing features of the installed software, programmed device memory, and/or protocols of the TPM chip.

In some embodiments, the software further verifies the device by determining whether the device CA certificate installed in the device memory was signed by a particular root CA. The software can then determine whether the device CA certificate installed in device memory is derived from the root CA certificate (e.g., utilizing OpenSSL). Further, the signed EK embedded in the device can be verified as corresponding to the TPM installed on the device. This may be performed by comparing an EK obtained from the CA signed package (installed in device memory) with an EK directly obtained from the TPM. If the device CA certificate or the EK cannot be verified, the software may notify the software operator and/or cease to operate the device normally.

Local Attestation

In some embodiments, a TPM and software installed on the device is utilized to perform an authentication process without requiring a connection with a remote entity. Traditionally, an API associated with a TPM is utilized for remotely "attesting" to the authenticity of software operating on the device or of the device itself. In some embodiments described herein, the TPM's API is, in contrast, utilized to create and utilize attestation identity keys (AIKs) in order to perform a local attestation to verify the legitimacy of the device onto which it is installed. A call to the TPM requests an AIK that is paired to a private key secured and maintained by the TPM (e.g., derived from the TPM's EK). The software may then sign an authentication token (e.g., a randomly generated number) using the public key and then call on the TPM to decrypt the signed token. The software operating on the device may also verify the public EK published by the TPM by verifying it with respect to the EK embedded in the CA certificate programmed in device memory and/or within software installed on the device. Calls to the TPM may be performed using available TPM APIs including, for example, those for TPM 1.2 or 2.0.

Remote Server Authentication

In some embodiments, an authentication token may be in part verified through a trusted remote authentication server. A root CA certificate as described above may be maintained by the trusted server and used to verify the device CA certificate programmed into the device such as during manufacture. An authentication token encrypted using the device CA certificate on the device may be transmitted to the server.

The authentication server may be programmed to decrypt the token and transmit the decrypted token to the device for verification. In some embodiments, if the device cannot be authenticated, the software may not complete a booting process, may not process network data, and/or may alert an administrator.

Figure 1A:
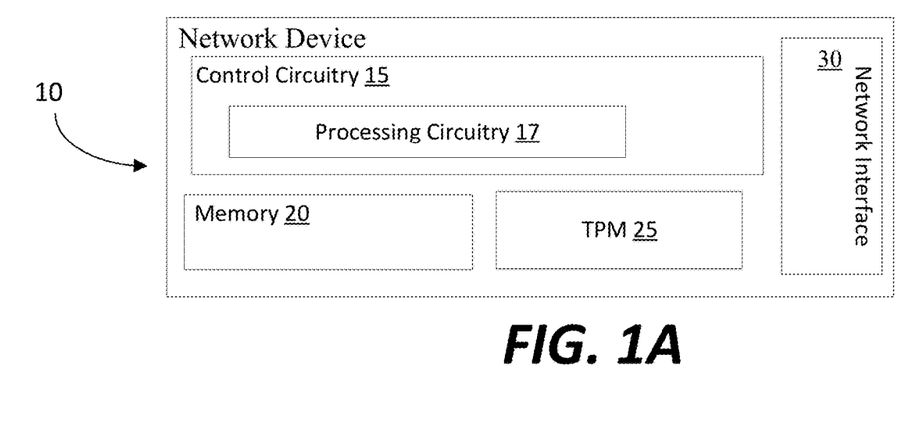
FIG. 1A shows a diagram of a network device with a TPM for performing attestation according to some embodiments.
Figure 1B:
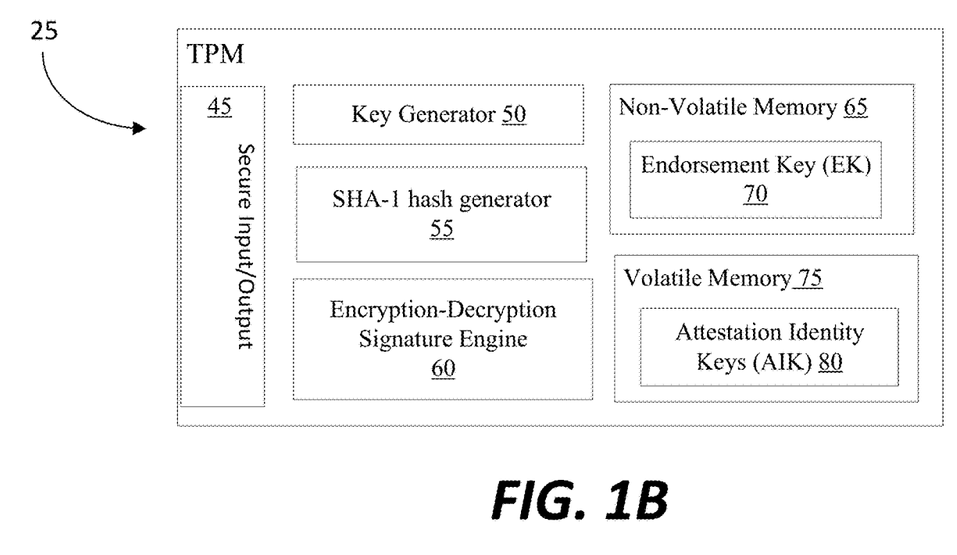
FIG. 1B shows a diagram of the TPM of FIG. 1A.

FIG. 1A shows a diagram of a network device 10 with a TPM 25 for performing attestation according to some embodiments. FIG. 1B shows a diagram of the TPM 25 of FIG. 1A. In some embodiments, device 10 is configured to perform attestation/authentication prior to its deployment and in connection with integration of TPM 25 into the device 10.

Some configurations may include a package signed using a certification authority (CA) certificate in which the package (payload) includes parameters tied to the device. These parameters may include an endorsement key (EK) 70 of TPM 25 and/or a unique identification parameter (e.g., a serial number) associated with device 10. In some embodiments, the signed certificate may be programmed into a non-volatile segment (e.g., flash memory) of memory 20. An API may also be programmed into a non-volatile memory 65 of TPM 25 to which calls may be made via a secure input/output (I/O) 45 of TPM 25. Processing circuitry 17 may be connected to I/O 45 through which TPM API calls and output may be directed.

TPM 25 includes a key generator 50 which may be used to generate an attestation identity key (AIK) 80 (public/private encryption key pair) derived from EK 70, which may be stored in a volatile memory 75 of TPM 25. TPM 25 also includes a hash generator 55 (e.g., a SHA hash generator), a random number generator 57, and an encryption-decryption signature engine 60 which may be used to encrypt/decrypt data based upon AIK 80 or other AIKs. Such components of TPM 25 may be used to perform various attestation functions such as described further herein and can be accessed through use the TPM 25's API.

Processing circuitry 17 may also be connected with network interface 30, which can be used to communicate with external devices over a network such as further described herein. Software may be installed on device 10 such as in a memory 20 (which may be volatile and/or non-volatile memory) and executed by processing circuitry 17. In some embodiments, the software is distributed by a trusted source (e.g., a network server associated with the device distributor) and programmed to perform an attestation/authentication process on device 10 using TPM 25. In some embodiments, the software is programmed with parameters that can be used for comparison/authentication of device 10/TPM 25 including the EK of the TPM and CA parameters associated with the initial programming of device 10's memory.

Figure 2:
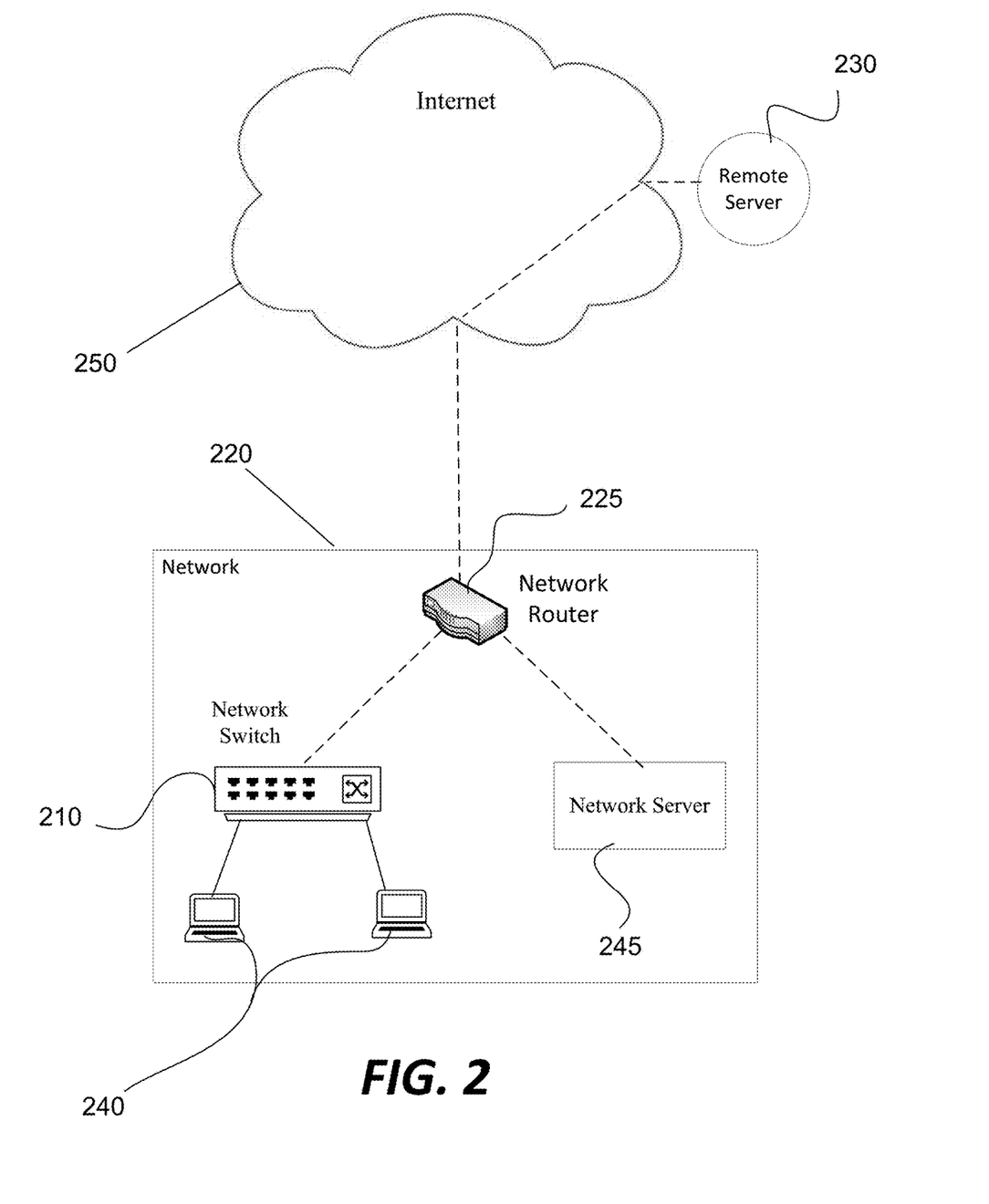
FIG. 2 is a block diagram of an illustrative network topology for performing device attestation according to some embodiments.

FIG. 2 is a block diagram of an illustrative network topology for performing device attestation according to some embodiments. A device 210 including a TPM is configured in a manner similar to device 10 described above (with respect to FIGS. 1A-1B) and deployed in a local network 220. Device 210 is, for example, a network switch and is used to connect other devices 240 to network 220. Device 210 may be connected to a network router 225 which connects network 220 to other networks including internet 250 and a remote server 230. Network 220 also includes a local server 245.

Prior to allowing device 210 to perform normal networking functions (e.g., switching/routing functions for network 220), device 210 may execute an attestation/authentication process using software installed on the device such as software from a trusted source. As described further herein, the attestation process may be performed using a trusted remote server (e.g., server 230), a network server 245, and/or "locally" by the device without requiring communication with an external server.

Figure 3:
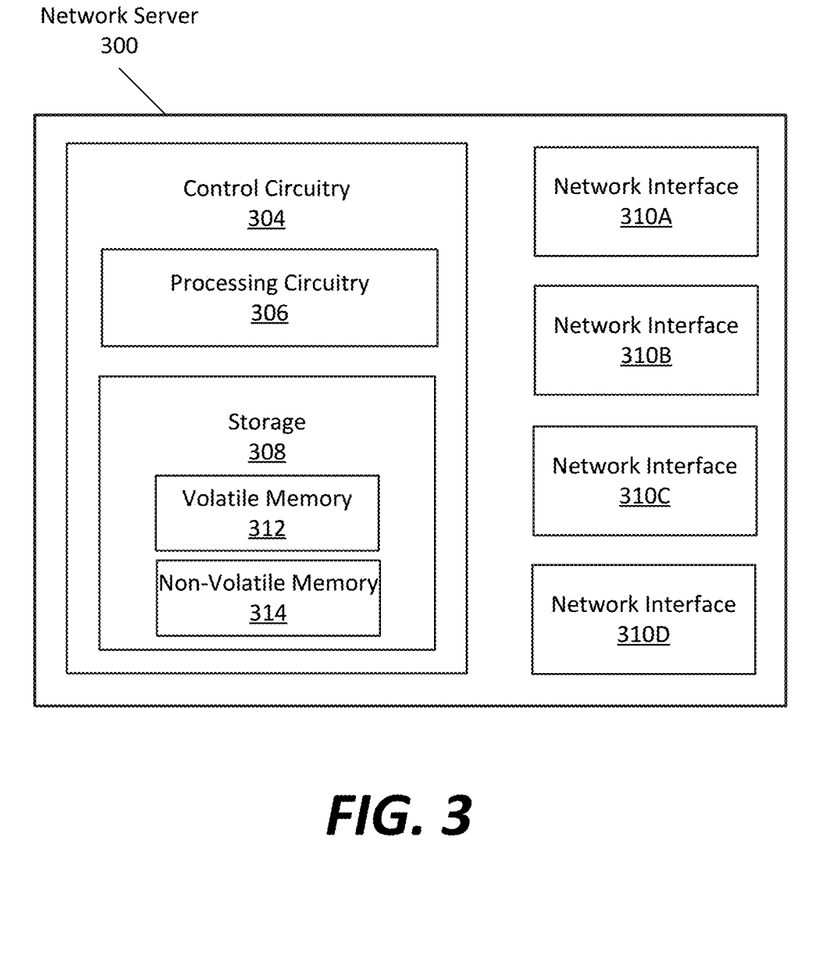
FIG. 3 shows a diagram of a network server for performing device attestation according to some embodiments.

FIG. 3 shows a diagram of a network server 300 for performing device attestation according to some embodiments. Server 300 may receive network traffic (e.g., from network devices 10 and 210)) via a network interface 310 and provide attestation services through control circuitry 304, which includes processing circuitry 306 and storage 308, in order to confirm the authenticity of a device to which it is connected. While server 300 is shown as including four network interfaces (e.g., network interfaces 310A, 310B, 310C, and 310D), this is merely illustrative, and those skilled in the art will appreciate that network device 300 may include any number of network interfaces, and that the network interfaces may be of any type of wired or wireless network interface, such as RJ45 ethernet ports, a coaxial ports, logical ports, wireless interfaces (e.g., 802.11x interfaces, BLUETOOTH interfaces, cellular interfaces, etc.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor).

The circuitry described herein may execute instructions included in software running on one or more general purpose or specialized processors. Multiple circuits may be provided to handle simultaneous processing functions. In some embodiments, control circuitry 304 executes instructions for verifying authentication parameters from devices including CA and EK parameters obtained from a device and its TPM, as described further below with reference to FIGS. 4-7. Control circuitry 304 may further provision devices with operating software and configurations for performing attestation/authentication while connected to network server 300.

Storage 308 may include volatile random-access memory (RAM) 312, which does not retain its contents when power is turned off, and non-volatile RAM 314, which does retain its contents when power is turned off. In some embodiments, storage 308 may be an electronic storage device that is part of control circuitry 304. As referred to herein, the phrase "electronic storage device" or "storage device" should be understood to mean any device for storing electronic data, computer software, instructions, and/or firmware, such as random-access memory, content-addressable memory, hard drives, optical drives, solid state devices, quantum storage devices, or any other suitable fixed or removable storage devices, and/or any combination of the same. In some embodiments, a copy of an EK for a particular TPM/Device and/or a private/public encryption key that is associated with a public key stored in the memory of an authentic network device (e.g., device 10 and 210) is kept stored in storage 308.

In some embodiments, storage 308 stores provisioning software and configurations for network devices to perform attestation.

A system for authenticating the origin of a network device (e.g., the systems described in reference to FIGS. 1A-B, 2, and 3) may be a stand-alone application implemented on a device (e.g., devices 10 and 210) and/or at least partially implemented on a server (e.g., servers 230, 245, and 300). The system may be implemented as software or a set of executable instructions. The instructions for performing any of the embodiments discussed herein of authentication/attestation may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 1A the instructions may be stored in memory 20, and executed by control circuitry 15 of network device 10.

Figure 4:
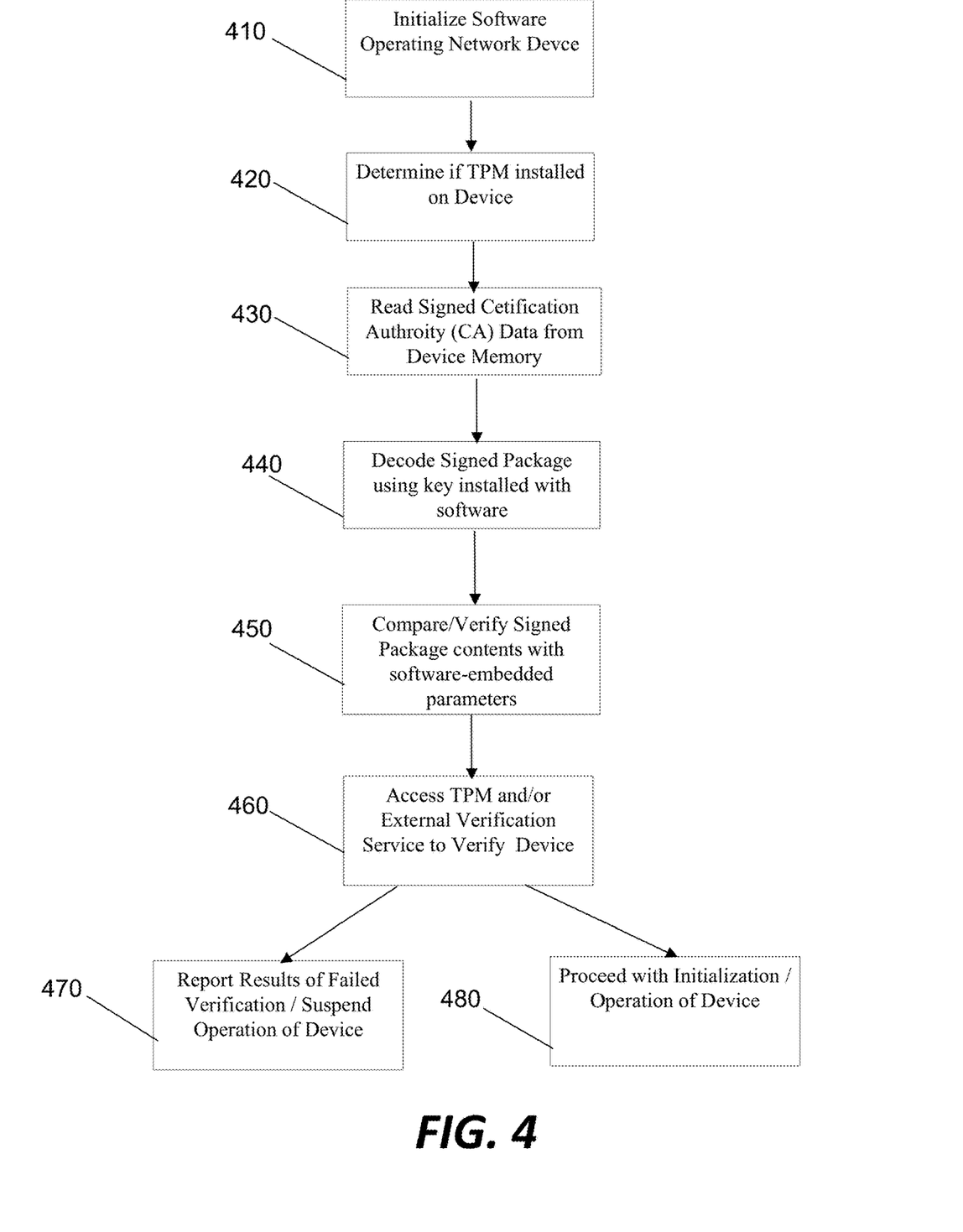
FIG. 4 is a flowchart of an attestation process of a network device according to some embodiments.

FIG. 4 is a flowchart of an attestation process of a network device according to some embodiments. At block 410, software including an attestation/authentication procedure initializes on a network device (e.g., network device 10 or 210). The software may be an extensible operating system (EOS) installed on the device and, upon an initial bootup, may initiate execution of an attestation/authentication process according to some embodiments. At block 420, the attestation/authentication process determines if a TPM (e.g., TPM 25) is integrated into the device. In some embodiments, this may be done by accessing system parameters of the device and/or executing TPM API commands which indicate the presence of a TPM.

At block 430, authentication is further performed by attempting to extract particular CA parameters (e.g., a signed CA package) from the memory of the device (e.g., memory 20) expected to be programmed within an authentic device. At block 440, the process attempts to decode the extracted CA parameters using a decryption key such as may be embedded in the software or otherwise obtained from a trusted source (e.g., server 230). The decoded package may include parameters particular to the device and/or TPM installed on the device such as a unique identification parameter (e.g., serial number of the device) and/or EK.

At block 450, the process verifies the CA parameters with parameters obtained from a trusted source (e.g., embedded in the software) or by using an external trusted server (e.g., server 230). Verification may include a comparison between the trusted parameters and CA parameters to confirm a match (e.g., determining that the EK from the CA corresponds to the EK from the TPM and a device identification parameter in the signed CA package corresponds to an identification parameter from a trusted source). In some embodiments, the trusted source from which the identification parameter (e.g., serial number) is obtained includes a hard-coded register of the device (e.g., in BIOS).

At block 460, the process may further authenticate the device through a local attestation procedure utilizing the TPM installed on the device or a remote attestation procedure utilizing a remote trusted resource (e.g., a trusted remote server). In some embodiments, a local attestation procedure requests that the device's TPM generate an AIK (e.g., AIK 80 through a TPM API call) and produce a public key associated with the AIK. The process may then obtain a randomly generated number or another token (e.g., a random number using random number generator 57 of TPM 25 of FIG. 1B). The process may then sign/encrypt the token using the AIK's public key, and forward the encrypted token to the TPM, requesting that the TPM decrypt the token using the TPM's private AIK key (e.g., using TPM API calls).

In some embodiments, a remote attestation process utilizes a remote resource (e.g., remote server 230) to authenticate the device. The software operating on the device may encrypt a token using a public key decoded from the signed CA package. The encrypted token may then be transmitted to the remote server with a request that the server decrypt and return the decrypted token.

In some embodiments, if one or more of the authentication/attestation procedures described above with reference to blocks 420, 430, 440, 450, and 460 fails to complete successfully, the software operating on the device may, at block 470, suspend normal operation of the device and/or notify an administrator of the device of the failure. In some embodiments, notification of an administrator includes transmitting a report to a connected device (e.g., local network server 245 of FIG. 2). In some embodiments, if authentication/attestation is successful using at least some of or all of the procedures described above, the software operating on the device may proceed at block 480 with operating the device normally (e.g., fully performing network switching/routing functions).

Figure 5:
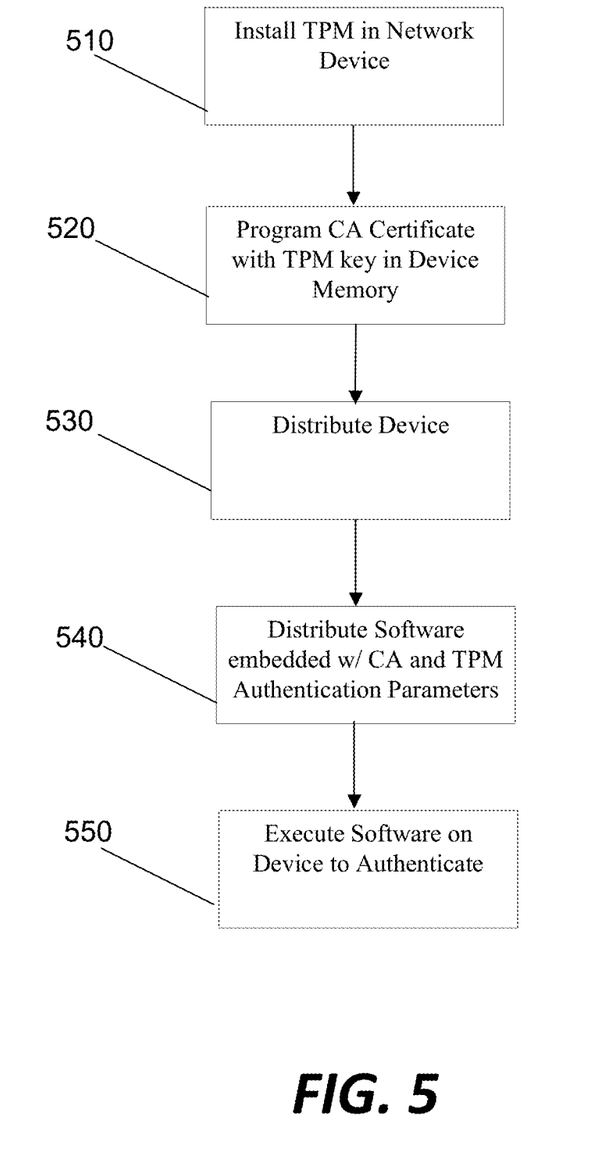
FIG. 5 is a flowchart of a process for configuring a network device for attestation according to some embodiments.

FIG. 5 is a flowchart of a process for configuring a network device for attestation according to some embodiments. At block 500, a device is setup/configured for performing authentication/attestation such as, for example, as described above with respect to FIG. 4. At block 510, a TPM (e.g., TPM 25) is procured and installed into a network device (e.g., device 10 of FIG. 1). In some embodiments, the TPM includes an endorsement key (EK). A public key associated with the EK may be obtained (e.g., using a TPM API call) during the configuration process, and maintained by a trusted source (e.g., a remote server). A unique identification parameter of the device (e.g., a serial number) may also be obtained and maintained by the trusted source.

At block 520, a CA certificate is generated and a private key associated with the CA may also maintained by the trusted source. The device is programmed with a data package signed using the CA. In some embodiments, the data package includes the public key associated with the EK of the TPM and/or the unique identification parameter of the device. In some embodiments, the package includes a public key of the CA which may be used to encrypt tokens such as described above with respect to a remote attestation process (e.g., as described above with respect to FIG. 4). In some embodiments, the signed data package is programmed in non-volatile memory of the device (e.g., within memory 20 of device 10). In some embodiments, the data package is programmed in a read only memory (ROM) or a flash memory of device 10.

At block 530, the device is distributed into service (e.g., to purchasers) with a TPM and programming that may be used to authenticate/attest the device's origin. At block 540, the device may be provisioned/updated with operating software (either prior to or after distribution of the device). The software is programmed to execute an authentication/attestation process utilizing the TPM and/or a remote server (e.g., such as described with respect to FIG. 4). Once the device is deployed (e.g., in network 220) and initializing commences, an authentication/attestation process is executed at block 550 such as described further herein.

Figure 6:
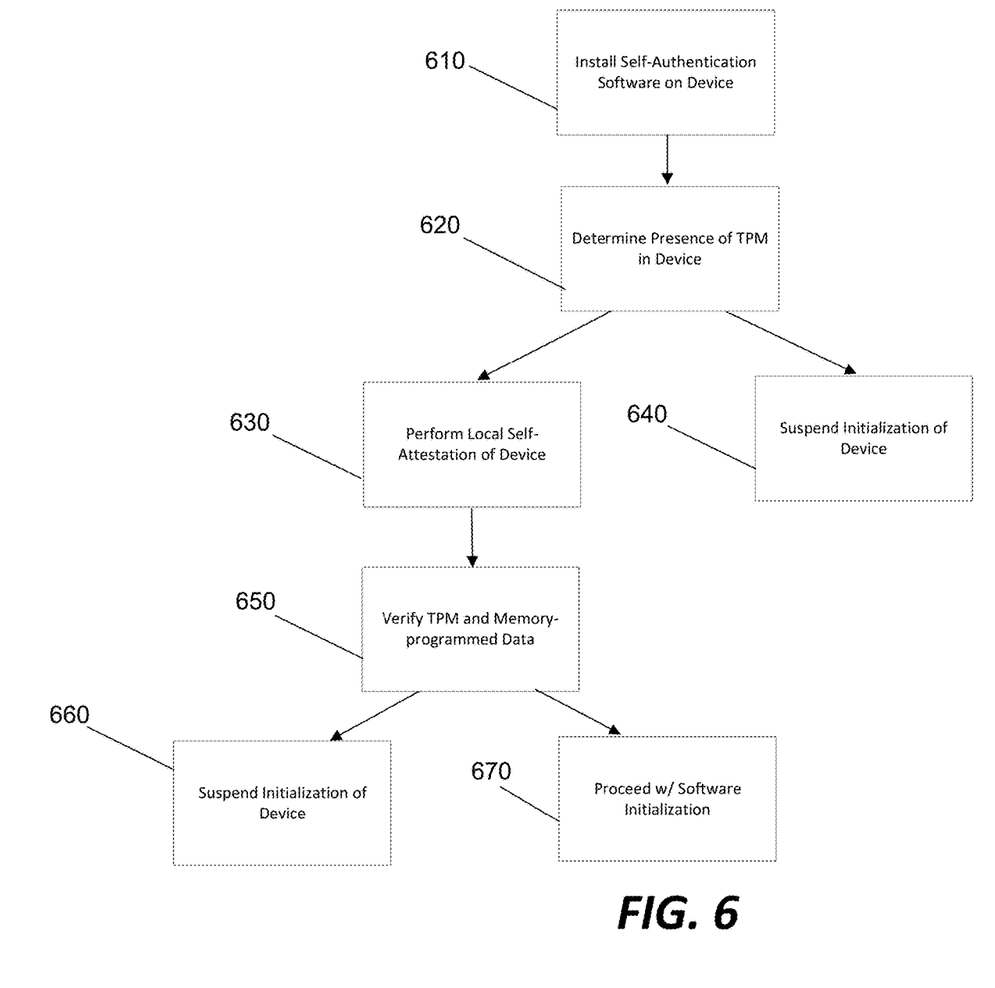
FIG. 6 is a flowchart of a self-attestation process of a network device according to some embodiments.

FIG. 6 is a flowchart of a self (or local)-attestation process of a network device according to some embodiments. At block 610, a network device configured for self-attestation/authentication is provisioned with software for executing an attestation/authentication process utilizing the device's TPM and configuration. The device may be configured, for example, with a TPM and programmed memory as described above in reference to FIG. 5. The attestation/authentication software may be obtained from a trusted resource (e.g., downloaded from remote server 230 of FIG. 2).

At block 620, the attestation/authentication software is executed on the device and determines whether the device includes a TPM with which the attestation/authentication process can be executed. If a TPM is detected, the device proceeds with performing a local authentication/attestation process at block 630. If such a TPM is not detected, authentication/attestation is suspended at block 640. Suspension may include notifying a network administrator of a failure of the authentication/attestation process and/or not permitting the device to perform some or all of its normal network processing functions (e.g., switching, routing).

At block 650, the local authentication/attestation process proceeds by verifying the authenticity of the device and its TPM through execution of the attestation/authentication software. The process may include verifying that a CA certificate programmed into the device's memory is derived from a certificate programmed into the authentication/attestation software. For example, some embodiments may utilize OpenSSL or a similar programming interface to verify the authenticity of a CA certificate programmed into the device's memory. A process may include a call such as "openssl verify -verbose -CAfile RootCertificate.pem IntermediateCertificate.pem" where "IntermediateCertificate.pem" is an exemplary intermediate CA certificate (e.g., programmed in device memory) and "RootCertificate.pem" is an exemplary root CA certificate (e.g. embedded into the authentication/attestation software). Such a call can indicate whether the memory-programmed CA certificate is derived from a root certificate embedded in the attestation/authentication software and/or obtained from a trusted source.

In some embodiments, the process may further attest to the authenticity of the device by verifying device-specific parameters, including a TPM EK programmed in device memory (e.g., prior to device deployment as described in reference to FIG. 5). As described above, these parameters may be included in a package/payload signed by a ("chip-signing") CA. The package may be decrypted and verified using a CA certificate included with the installed software and also using "trusted" parameters (e.g., included with the software and/or obtained directly from the device/TPM) to compare against the decrypted payload parameters. For example, a public EK may be obtained directly from the TPM to compare with the payload version of an EK. A device ID (e.g., serial number) may also be obtained directly from the device (e.g., a device register) for comparison with the payload.

The process may further attest to the authenticity of the TPM by requesting an AIK paired to the TPM's EK. The process implemented with the attestation/authentication software may then encrypt a token (e.g., randomly generated value) using the AIK. A command such as "MakeCredential" utilizing the TPM 1.2 API may be used, for example, to obtain such an encrypted token. The process may then request that the TPM decrypt the signed token to verify that the AIK originated from the TPM. This request may be performed using a command such as "ActivateCredential" of the TPM 1.2 API, for example.

If the device and TPM are successfully authenticated and attested to, the process may them execute/permit normal operational device initialization and functionality (e.g., configuration/switching/routing functions) at block 670. If the authentication/attestation process is unsuccessful, the device, at block 660, may not proceed with or permit all or some normal operations of the device and/or notify a network administrator as further described herein.

Figure 7:
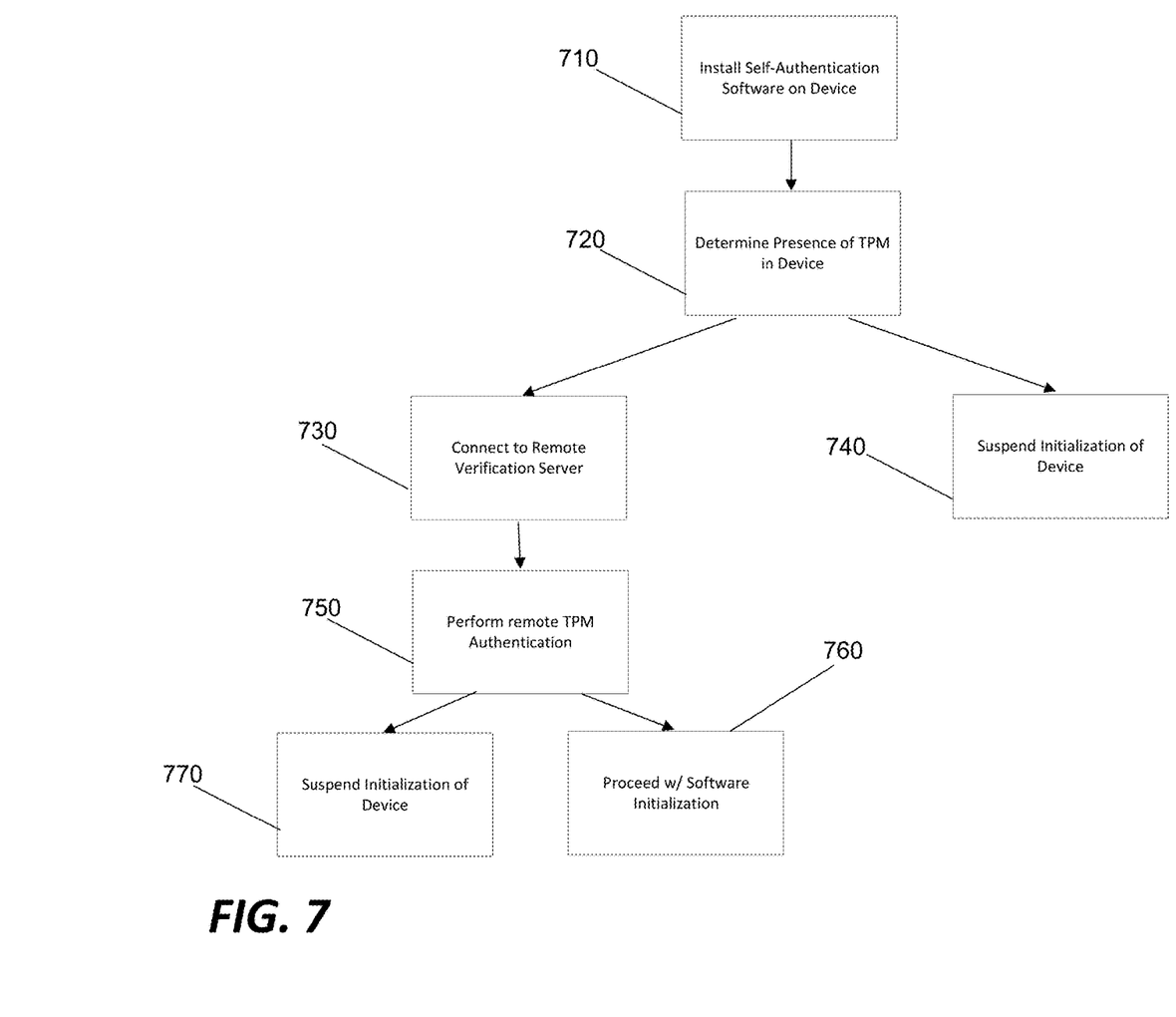
FIG. 7 is a flowchart of an attestation process of a network device using a remote server according to some embodiments.

FIG. 7 is a flowchart of an attestation process of a network device using a remote server according to some embodiments. At block 710, a network device configured for self-attestation/authentication is provisioned with software for executing a remote attestation/authentication process utilizing the device's TPM and a remote service (e.g., via remote server 230 of FIG. 2). The device may be configured, for example, with a TPM and programmed memory as described above in reference to FIG. 5. The attestation/authentication software installed on the device may have been installed at the time of manufacture and/or installed/updated at a later time such as by utilizing a remote service.

At block 720, the process may determine whether the device is equipped with a TPM such as described above. If the presence of the TPM is confirmed, the process may proceed by connecting the device with a remote service (e.g., remote server 230) at block 730. If the TPM's presence cannot be confirmed, the process may halt initialization and normal operation of the device at block 740.

At block 750, once a connection with a remote service has been established, a remote verification process of the device and TPM may proceed. The process may include verifying parameters (e.g., signed CA certificate) previously installed in device memory (e.g., during manufacture) by using the remote service. The remote service may maintain a root CA certificate and confirm whether the signed CA certificate installed on the device is derived from the root certificate. This can be performed, for example, using the "openssl verify" command described above. In some embodiments, the signed CA certificate may be used to encrypt a token (e.g., a random number generated by the device) and request that the remote service decrypt the token in order to verify the authenticity of the signed CA.

In some embodiments, the remote service can further authenticate the TPM using an additional remote attestation process. The process may request a signed AIK from the device generated using the TPM (e.g., using a TPM API) including an encrypted token (e.g., random number). The service may maintain a copy of the EK of the TPM associated with the device (e.g., obtained securely in connection with installation of the TPM), with which the service and attestation/authentication software can validate whether the signed AIK certificate belongs to a TPM expected to be installed in an authentic device. The service may then encrypt a challenge (e.g., a random number) using the AIK and/or the public EK it maintains and request that the TPM decrypt the challenge(s) to verify the TPM's authenticity.

At block 770, if the authentication/attestation process at block 750 fails, the software operating the device may suspend normal operation of the device and/or notify a device/network administrator of the failure. At block 760, if the device and TPM are successfully authenticated/attested to, the process may them execute/permit normal operational device initialization and functionality (e.g., configuration/switching/routing functions).

What is claimed is:

1. A method for authenticating an origin of a network device, the method comprising:
in response to an initialization of the network device, the network device performing:
establishing communications with a trusted platform module (TPM) integrated into the network device;

reading from memory within the network device, an encryption certification authority (CA) signed data package, the data package including a device identification parameter and a trusted platform module (TPM) public key;

decoding the signed data package to obtain a decoded identification parameter and a decoded public TPM key;

obtaining a device identification parameter from the network device and a public TPM key from the TPM integrated into the network device;

determining whether the decoded identification parameter matches the network device-obtained identification parameter;

verifying whether the TPM-obtained public key and the decoded public TPM key correspond;

in response to one of failing to establish communications with the TPM, failing to match the decoded identification parameter, or failing to verify the TPM-obtained public key, performing at least one of suspending operation of the network device or transmitting a report of an authentication failure across a network on which the network device is operating;

obtaining an authentication token;

requesting and receiving an authentication identity key (AIK) from the TPM;

encrypting the authentication token using the AIK to generate an encrypted authentication token;

requesting that the TPM decrypt the encrypted authentication token;

determining whether the TPM correctly decrypted the encrypted authentication token; and when the TPM does not correctly decrypt the encrypted authentication token, performing at least one of interrupting operation of the network device or transmitting a report of an authentication failure across the network on which the network device is operating.

2. The method of claim 1, wherein requesting the decrypting of the encrypted authentication token is performed by using a TPM application programming interface (API).

3. The method of claim 1, wherein the authentication token is a random number generated by the TPM.

4. The method of claim 1, wherein the signed data package is read from at least one of read only memory (ROM) or flash memory of the network device.

5. The method of claim 1, wherein, in response to the initialization of the network device, the network device further performs:

authenticating the device identification parameter by determining whether the device identification parameter obtained from the network device corresponds to an identification parameter maintained by a remote authentication server or to at least one of an identification parameter embedded in an operating system (OS) operating on the network device;

when failing to authenticate the device identification parameter, performing at least one of interrupting operation of the OS or transmitting a report of an authentication failure across the network on which the network device is operating.

6. The method of claim 1, wherein, in response to the initialization of the network device, the network device further performs:

obtaining a root CA certificate embedded in an operating system (OS) installed on the network device;

verifying that the CA of the signed data package is derived from the root CA certificate;

when the authentication server fails to verify that the CA of the signed data package is derived from the root CA certificate, performing at least one of interrupting operation of the OS or transmitting a report of an authentication failure across the network on which the network device is operating.

7. The method of claim 1, wherein, in response to the initialization of the network device, the network device further performs:

obtaining a root CA certificate embedded in an operating system OS) installed on the network device;

verifying that the CA of the signed data package is derived from the root CA certificate;

when the authentication server fails to verify that the CA of the signed data package is derived from the root CA certificate, performing at least one of interrupting operation of the OS or transmitting a report of an authentication failure across the network on which the network device is operating.

8. A system for authenticating an origin of the network device, the system comprising:

a network device;

a trusted platform module (TPM) integrated into the network device;

wherein the network device is programmed and configured to cause one or more processors to perform:

reading one or more encrypted parameters from a memory of the network device;

decoding the one or more encrypted parameters;

determining whether one or more of the decoded parameters match parameters obtained from the TPM;

determining whether one or more of the decoded parameters match parameters obtained from a read only memory (ROM) of the network device;

in response to a mismatch between the decoded parameters and the parameters obtained from the TPM or the ROM, performing at least one of suspending operation of the network device or transmitting a report of an authentication failure across a network on which the network device is operating;

obtaining an authentication token;

requesting and receiving an authentication identity key (AIK) from the TPM;

encrypting the authentication token using the AIK to generate an encrypted authentication token;

requesting that the TPM decrypt the encrypted authentication token;

determining whether the TPM correctly decrypted the authentication token;

when the TPM does not correctly decrypt the authentication token, performing at least one of interrupting operation of the network device or transmitting a report of an authentication failure across the network on which the network device is operating.

9. The system of claim 8, wherein requesting the decrypting of the encrypted authentication token is performed by using a TPM application programming interface (API).

10. The system of claim 8, wherein the authentication token is a random number generated by the TPM.

11. The system of claim 8, wherein the encrypted parameters are read from at least one of read only memory (ROM) or flash memory of the network device.

12. The system of claim 8, wherein the network device is further programmed and configured to cause one or more processors to perform:

authenticating the device identification parameter by determining whether the device identification parameter obtained from the network device corresponds to at least one of an identification parameter embedded in an operating system (OS) operating on the network device or to an identification parameter maintained by a remote authentication server;

when failing to authenticate the device identification parameter, performing at least one of interrupting operation of the OS or transmitting a report of an authentication failure across the network on which the network device is operating.

13. The system of claim 8, wherein the network device is further programmed and configured to cause one or more processors to perform:

obtaining a root CA certificate embedded in an operating system (OS) installed on the network device;

obtaining a CA from the encrypted parameters;

verifying that the CA from the encrypted parameters is derived from the root CA certificate;

when the authentication server fails to verify that the CA from the encrypted parameters is derived from the root CA certificate, performing at least one of interrupting operation of the OS or transmitting a report of an authentication failure across the network on which the network device is operating.

14. A method for authenticating an origin of a network device, the method comprising:

in response to an initialization of the network device, the network device performing:

establishing communications with a trusted platform module (TPM) integrated into the network device;

reading from memory within the network device, an encryption certification authority (CA) signed data package, the data package including a device identification parameter and a trusted platform module (TPM) public key;

decoding the signed data package to obtain a decoded identification parameter and a decoded public TPM key;

obtaining a device identification parameter from the network device and a public TPM key from the TPM integrated into the network device;

determining whether the decoded identification parameter matches the network device-obtained identification parameter;

verifying whether the TPM-obtained public key and the decoded public TPM key correspond;

in response to one of failing to establish communications with the TPM, failing to match the decoded identification parameter, or failing to verify the TPM-obtained public key, performing at least one of suspending operation of the network device or transmitting a report of an authentication failure across a network on which the network device is operating;

obtaining an authentication token;

encrypting the authentication token using a public encryption key obtained from the signed data package to generate an encrypted authentication token;

forwarding the encrypted authentication token to a remote authentication server and requesting that the authentication server authenticate the encrypted authentication token;

when the authentication server does not authenticate the encrypted authentication token, performing at least one of suspending operation of the network device or transmitting a report of an authentication failure across the network on which the network device is operating.

15. The method of claim 14, wherein, in response to the initialization of the network device, the network device further performs:

obtaining a root CA certificate embedded in an operating system (OS) installed on the network device;

verifying that the CA of the signed data package is derived from the root CA certificate;

when the authentication server fails to verify that the CA of the signed data package is derived from the root CA certificate, performing at least one of interrupting operation of the OS or transmitting a report of an authentication failure across the network on which the network device is operating.

* * * * *